(12) United States Patent
Ma et al.

(10) Patent No.: US 11,837,696 B2
(45) Date of Patent: Dec. 5, 2023

(54) SOLID ELECTROLYTE, PREPARATION METHOD THEREOF, METAL AIR BATTERY INCLUDING THE SAME, AND ELECTROCHEMICAL DEVICE INCLUDING THE SAME

(71) Applicant: Samsung Electronics Co., Ltd., Suwon-si (KR)

(72) Inventors: Sangbok Ma, Suwon-si (KR); Donghwa Seo, Burlington, MA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 646 days.

(21) Appl. No.: 16/989,229

(22) Filed: Aug. 10, 2020

(65) Prior Publication Data

US 2021/0184249 A1    Jun. 17, 2021

Related U.S. Application Data

(60) Provisional application No. 62/947,589, filed on Dec. 13, 2019.

(30) Foreign Application Priority Data

Dec. 17, 2019    (KR) .................... 10-2019-0169185

(51) Int. Cl.
*H01M 10/0562* (2010.01)
*C01G 27/00* (2006.01)
*H01M 10/0525* (2010.01)

(52) U.S. Cl.
CPC ...... *H01M 10/0562* (2013.01); *C01G 27/006* (2013.01); *H01M 10/0525* (2013.01); *C01P 2002/34* (2013.01); *C01P 2002/72* (2013.01); *C01P 2006/40* (2013.01); *H01M 2300/0071* (2013.01)

(58) Field of Classification Search
None
See application file for complete search history.

(56) References Cited

U.S. PATENT DOCUMENTS

| | | | |
|---|---|---|---|
| 9,735,426 B2 * | 8/2017 | Kim | C01G 45/1257 |
| 10,734,665 B2 | 8/2020 | Higashino et al. | |
| 2006/0078790 A1 * | 4/2006 | Nimon | H01M 4/664 |
| | | | 429/246 |

(Continued)

FOREIGN PATENT DOCUMENTS

| | | |
|---|---|---|
| EP | 3659972 A2 | 6/2020 |
| JP | 2017041308 A | 2/2017 |
| KR | 101687808 B1 | 12/2016 |

(Continued)

OTHER PUBLICATIONS

Extended European Search Report dated Jan. 15, 2021 of EP Patent Application No. 20190241.8.

(Continued)

*Primary Examiner* — Eli S Mekhlin
(74) *Attorney, Agent, or Firm* — Cantor Colburn LLP

(57) ABSTRACT

A solid electrolyte including: an oxide represented by Formula 1

$$Li_yM_zHfO_{3-x}$$    Formula 1 wherein, in Formula 1,
M is a divalent element, a trivalent element, or a combination thereof, and
$0 \leq x < 3$, $0 < y < 1$, and $0 < z < 1$.

24 Claims, 4 Drawing Sheets

(56) References Cited

U.S. PATENT DOCUMENTS

2020/0119346 A1     4/2020   Ma et al.

FOREIGN PATENT DOCUMENTS

| KR | 1020170099195 A | 8/2017 |
| KR | 1020180051716 A | 5/2018 |
| KR | 1020200041663 A | 4/2020 |

OTHER PUBLICATIONS

Y. Xie et al., "Requirements for reversible extra-capacity in Li-rich layered oxides for Li-ion batteries," Energy & Environmental Science, Nov. 28, 2016, pp. 266-274, vol. 10.

Yazhou Kong et al., "Conductivity and electrochemical stability of perovskite-structured lithium-strontium-niobium-hafnium-oxide solid Li-ion conductors," Journal of Materials Science: Materials in Electronics, Feb. 27, 2017, pp. 8621-8629, vol. 28.

* cited by examiner

SOLID ELECTROLYTE, PREPARATION METHOD THEREOF, METAL AIR BATTERY INCLUDING THE SAME, AND ELECTROCHEMICAL DEVICE INCLUDING THE SAME

CROSS-REFERENCE TO RELATED APPLICATIONS

This application claims priority to and the benefit of U.S. Provisional Application No. 62/947,589, filed on Dec. 13, 2019, in the U.S. Patent and Trademark Office, and Korean Patent Application No. 10-2019-0169185, filed on Dec. 17, 2019, in the Korean Intellectual Property Office, and all the benefits accruing therefrom under 35 U.S.C. § 119, the contents of which are incorporated herein in their entireties by reference.

BACKGROUND

1. Field

The present disclosure relates to a solid electrolyte, a method of preparing the same, a metal air battery including the solid electrolyte, and an electrochemical device including the solid electrolyte.

2. Description of Related Art

A lithium air battery uses lithium metal as an anode, and because air is used as a cathode active material, there is no need to store air, and therefore, a lithium air battery may function as a high-capacity battery. The theoretical specific energy of a lithium-air battery is 3500 watt-hours per kilogram (Wh/kg) or greater, which is very high.

However, when lithium lanthanum titanium phosphate (LTAP), or the like, are used as a solid electrolyte in a lithium air battery, the solid electrolyte is unstable due to the presence of LiOH, which is a discharge product of the lithium-air battery. Therefore, there is a need for an improved solid electrolyte for use in a lithium-air battery.

SUMMARY

Provided is a solid electrolyte having improved stability in the presence of lithium, and preparation methods thereof.

Provided is a lithium air battery including the solid electrolyte.

Provided is an electrochemical device including the solid electrolyte.

Additional aspects will beset forth in part in the description which follows and, in part, will be apparent from the description.

According to an aspect, a solid electrolyte includes: an oxide represented by Formula 1, Formula 1 wherein, in Formula 1,

M is a divalent element, a trivalent element, or a combination thereof, and

0≤x<3, 0<y<1, and 0<z<1.

According to an aspect, a metal air battery includes: a cathode; an anode; and an electrolyte between the cathode and the anode, wherein at least one of the cathode, the anode, or the electrolyte includes the solid electrolyte.

Also disclosed is a protection layer that includes the solid electrolyte.

According to an aspect, an electrochemical device includes: an anode; a cathode; and the solid electrolyte between the anode and the cathode.

The electrochemical device may include a battery, an accumulator, a supercapacitor, a fuel cell, a sensor, or an electrochromic device.

Also disclosed is a protection layer for a lithium battery, the protection layer including: the solid electrolyte, wherein the solid electrolyte is disposed on a cathode or an anode.

According to an aspect, a method of preparing a solid electrolyte includes: providing a precursor mixture including a lithium precursor, a hafnium precursor, and an M precursor; and heat-treating the precursor mixture to prepare a solid electrolyte including an oxide represented by Formula 1, Formula 1 wherein, in Formula 1, M is a divalent element, a trivalent element, or a combination thereof, and 0≤x<3, 0<y<1, and 0<z<1.

BRIEF DESCRIPTION OF THE DRAWINGS

The above and other aspects, features, and advantages will be more apparent from the following description taken in conjunction with the accompanying drawings, in which.

DETAILED DESCRIPTION

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, a solid electrolyte, a preparation method thereof, a metal air battery including the solid electrolyte, and an electrochemical device including the solid electrolyte according to embodiments will be described.

There is provided a solid electrolyte including an oxide represented by Formula 1:

$$Li_yM_zHfO_{3-x} \quad \text{Formula 1}$$

wherein, in Formula 1, M is a divalent element, a trivalent element, or a combination thereof, and $0 \leq x < 3$, $0 < y < 1$, and $0 < z < 1$.

M is a cationic element.

The oxide of Formula 1 satisfies a charge balance to have a neutral state.

Figure 1:
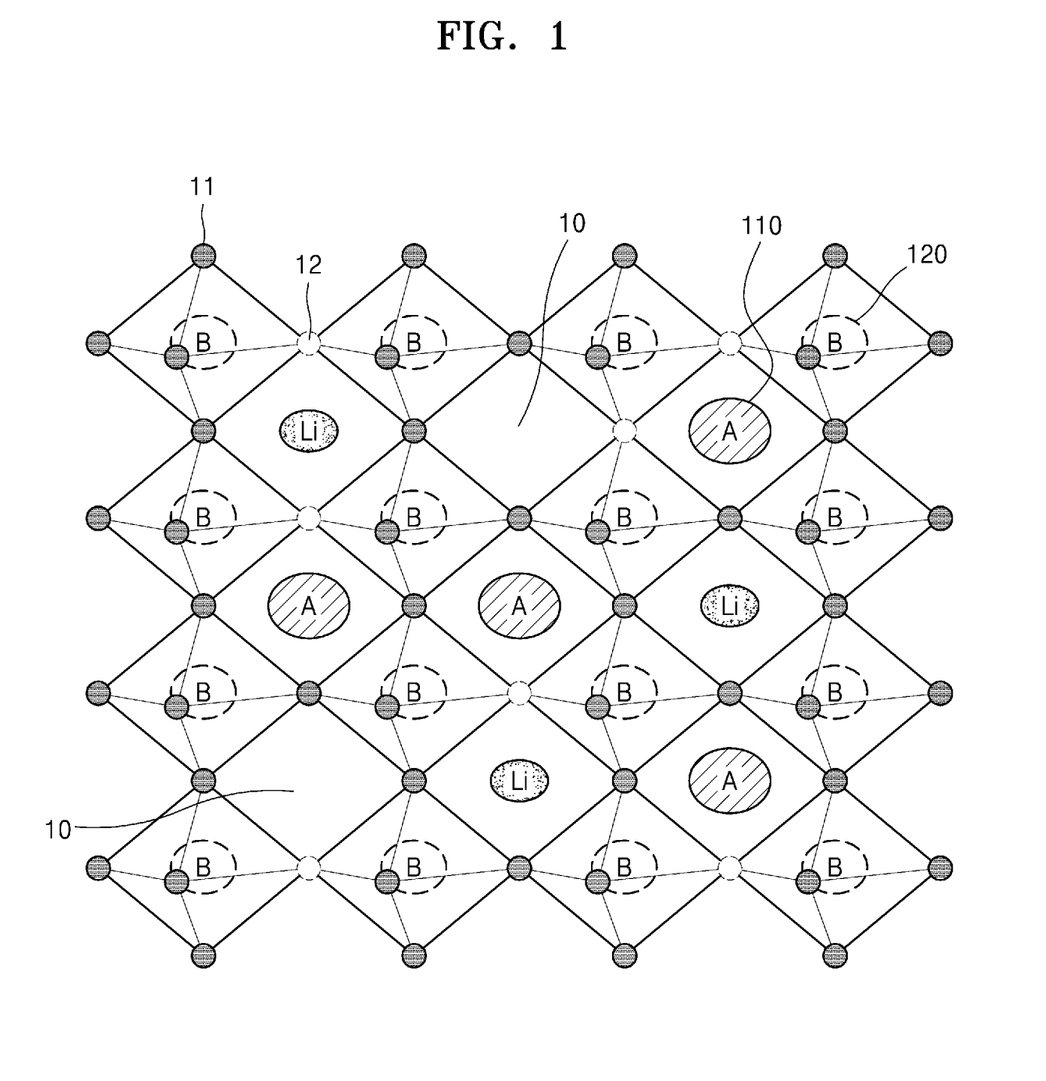
FIG. 1 illustrates an embodiment of a crystal structure of an oxide.

The oxide has a perovskite crystal structure or a perovskite-like crystal structure. "Perovskite structure" or a perovskite compound, as would be understood by an artisan in the solid-state sciences, and as is used herein, means that the compound is isostructural with perovskite, i.e., $CaTiO_3$. The formula for a perovskite structure is often referred as "$ABO_3$," which includes a divalent cation on an A-site 110 and a metal atom on a B-site 120, as illustrated in FIG. 1. According to an embodiment, the oxide may have a crystal structure in which Li, a vacancy, and M each reside on an A-site in the perovskite crystal structure, and hafnium (Hf) resides on a B-site in the perovskite crystal structure. M may be, for example, a divalent element, and the crystal structure may have an oxygen deficient structure based on charge balance.

The oxide of Formula 1 is an ion conductor that has a thermodynamically stable composition. The compound of Formula 1 improves ion conductivity by having excess lithium or an oxygen vacancy.

When a commercially available perovskite solid electrolyte such as lithium lanthanum titanium oxide (LLTO) is used in a lithium air battery having a lithium anode, titanium (Ti) in the lithium lanthanum titanium oxide solid electrolyte is reduced. While not wanting to be bound by theory, it is believed that the reduction in titanium results in mechanical deterioration of the solid electrolyte.

A solid electrolyte including the oxide of Formula 1 was found to have improved stability and prevent mechanical deterioration of the solid electrolyte when used in a lithium air battery having a lithium anode.

While not wishing to be bound by theory, when the oxide of Formula 1 contains hafnium, the hafnium is understood to prevent mechanical deterioration of the solid electrolyte and is believed to not be reduced by lithium. Accordingly, the solid electrolyte containing the oxide of Formula 1 has improved stability in the presence of lithium metal and reduced mechanical degradation. When a lithium air battery is manufactured using a solid electrolyte containing an oxide of Formula 1, the interface between the solid electrolyte and the lithium negative electrode stabilizes and the reversibility of the lithium air battery is stable in humid and/or atmospheric conditions. While not wanting to be bound by theory, it is understood that the improved stability and reversibility is because the solid electrolyte is an excellent ion conductor, and is stable against moisture and a strong base. A lithium air battery uses air as a cathode active material and uses lithium as an anode active material.

The solid electrolyte containing the oxide of Formula 1 is stable against moisture and a strong base, which may be confirmed based on the excellent ion conductivity after exposure to a strong base, such as lithium hydroxide, and/or moisture.

In Formula 1, M is a divalent cationic element, a trivalent cationic element, or a combination thereof.

According to an embodiment, in Formula 1, x is 0 or 0.1 to 0.9. x is 0, or 0.1 to 0.9, 0.1 to 0.8, 0.1 to 0.7, 0.1 to 0.6, 0.1 to 0.5, or 0.15 to 0.45, y is 0.1 to 0.9, 0.1 to 0.8, 0.1 to 0.7, 0.1 to 0.6, 0.1 to 0.5, or 0.1 to 0.4, z is 0.1 to 0.9, 0.1 to 0.8, 0.2 to 0.8 or 0.3 to 0.7, and y+z<1 is satisfied.

In Formula 1, the atomic ratio of lithium and hafnium is about 0.1:1 to 1:1, 0.1:1 to 0.9:1, 0.1:1 to 0.8:1, 0.1:1 to 0.4:1, 0.15:1 to 0.4:1 or 0.15:1 to 0.3:1.

In Formula 1, the atomic ratio of lithium and hafnium is about 0.1 to about 1, about 0.15 to about 0.9, about 0.2 to about 0.8, or about 0.3 to about 0.4.

The divalent cationic element is, for example, Sr, Ba, Ca, Mg, or a combination thereof.

The trivalent cationic element is, for example, La, Ce, Pr, Gd, Y, Sc, or a combination thereof.

In Formula 1, M is Sr, Ba, Ca, Mg, La, Ce, Pr, Gd, Y, Sc, or a combination thereof.

In Formula 1, M may be Ba, Sr, Ca, La, Ce, Pr, Y, Sc, or a combination thereof, and x, y and z are each independently $0 \leq x < 3$, $0 < y < 1$, and $0 < z < 1$.

FIG. 1 is a schematic view illustrating an embodiment of a crystal structure of an oxide.

The oxide of Formula 1 has a perovskite crystal structure. As shown in FIG. 1, in the oxide of Formula 1, Li vacancies 10, and M are in an A-site 110 in the perovskite crystal structure, and hafnium (Hf), which is a tetravalent element, is in a B-site 120 in the perovskite crystal structure. M may be, for example, a divalent element.

Since the oxide has such a structure, oxidation of the A-site is suppressed, and an oxygen deficiency 12 is induced for charge balance of the oxide. In FIG. 1, reference numeral 11 denotes oxygen.

Unlike a prior art perovskite solid electrolyte, the oxide of Formula 1 does not include a high oxidation number element ion, such as tantalum or tungsten, which are not stable in the presence of lithium.

The oxide represented by Formula 1 may be an oxide represented by Formulae 2 to 9, or a combination thereof, $$Li_yBa_zHfO_{3-x} \qquad \text{Formula 2}$$

in Formula 2, $0 \leq x < 3$, $0 < y < 1$, and $0 < z < 1$, $$Li_ySr_zHfO_{3-x} \qquad \text{Formula 3}$$

in Formula 3, $0 \leq x < 3$, $0 < y < 1$, $0 < z < 1$, $$Li_yCa_zHfO_{3-x} \qquad \text{Formula 4}$$

in Formula 4, $0 \leq x < 3$, $0 < y < 1$, and $0 < z < 1$, $$Li_yLa_zHfO_{3-x} \qquad \text{Formula 5}$$

in Formula 5, $0 \leq x < 3$, $0 < y < 1$, and $0 < z < 1$, $$Li_yCe_zHfO_{3-x} \qquad \text{Formula 6}$$

in Formula 6, $0 \leq x < 3$, $0 < y < 1$, and $0 < z < 1$, $$Li_yPr_zHfO_{3-x} \qquad \text{Formula 7}$$

in Formula 7, $0 \leq x < 3$, $0 < y < 1$, and $0 < z < 1$, $$Li_yY_zHfO_{3-x} \qquad \text{Formula 8}$$

in Formula 8, $0 \leq x < 3$, $0 < y < 1$, and $0 < z < 1$, or $$Li_ySc_zHfO_{3-x} \qquad \text{Formula 9}$$

wherein, in Formula 9, $0 \leq x < 3$, $0 < y < 1$, and $0 < z < 1$.

In Formulae 1 to 9, each x may each independently be 0 to less than about 3, e.g., about 0.1 to about 2.9, about 0.2 to about 2.8, about 0.3 to about 2.7, about 0.4 to about 2.6, or about 0.5 to about 2.5, or about 0.1 to about 0.9, about 0.15 to about 0.8, about 0.2 to about 0.7, about 0.25 to about 0.6, or about 0.3 to about 0.5, and each y may independently be about 0.1 to about 0.9, and each z may be independently 0.1 to 0.9, and y+z<1.

In Formulae 1 to 9, each y may independently be about 0.1 to about 0.9, about 0.1 to about 0.8, about 0.1 to about 0.7, about 0.1 to about 0.6, about 0.1 to about 0.5, or about 0.1 to about 0.4, and each z may be about 0.1 to about 0.9, about 0.1 to about 0.8, about 0.2 to about 0.8 or about 0.3 to about 0.7, and y+z<1.

According to an embodiment, in Formulae 1 to 9, each x may independently be 0, about 0.1 to about 0.5, or about 0.15 to about 0.45, y may be about 0.1 to about 0.5 or about 0.1 to about 0.4, and z may be about 0.1 to about 0.8 or about 0.2 to about 0.8.

The oxide has improved stability in the presence of lithium compared to an available perovskite oxide. These characteristics may be confirmed through X-ray diffraction (XRD) analysis.

An analysis of the oxide of Formula 1 by X-ray diffraction (XRD), using Cu Kα radiation, has a diffraction peak at a diffraction angle of 31.0°2θ±1.0°2θ with an intensity (IA) that is equal to or greater than an intensity (IB) of a diffraction peak at a diffraction angle of 21.8°2θ±1.0°2θ. IA/IB is represented by Equation 1.

$$IA/IB = \{(\text{intensity of diffraction peak at a diffraction angle of } 31.0°2\theta \pm 1.0°2\theta)/(\text{intensity of diffraction peak at a diffraction angle of } 21.8°2\theta \pm 1.0°2\theta)\} \qquad \text{Equation 1}$$

IA/IB may be about 1 to about 25, about 1.5 to about 20, about 3 to about 15, about 5 to about 10, or about 1.5 to about 21.5.

The oxide represented by Formula 1 is, for example, $Li_{0.3}Sr_{0.5}HfO_{2.75}$, $Li_{0.3}Sr_{0.4}HfO_{2.55}$, $Li_{0.3}Ba_{0.4}HfO_{2.75}$, $Li_{0.3}Ba_{0.4}HfO_{2.55}$, $Li_{0.3}Ca_{0.4}HfO_{2.75}$, $Li_{0.3}Ca_{0.4}HfO_{2.55}$, $Li_{0.10}Ca_{0.80}HfO_{2.75}$, $Li_{0.20}Ca_{0.60}HfO_{2.7}$, $Li_{0.25}Ca_{0.60}HfO_{2.625}$, $Li_{0.40}Ca_{0.20}HfO_{2.6}$, $Li_{0.10}Sr_{0.80}HfO_{2.85}$, $Li_{0.20}Sr_{0.60}HfO_{2.7}$, $Li_{0.25}Sr_{0.50}HfO_{2.625}$, $Li_{0.40}Sr_{0.20}HfO_{2.7}$, $Li_{0.10}Ba_{0.80}HfO_{2.85}$, $Li_{0.20}Ba_{0.60}HfO_{2.7}$, $Li_{0.25}Ba_{0.60}HfO_{2.825}$, $Li_{0.40}Ba_{0.20}HfO_{2.7}$, $Li_{0.34}La_{0.55}HfO_3$, $Li_{0.34}Ce_{0.55}HfO_3$, $Li_{0.34}Pr_{0.55}HfO_3$, $Li_{0.34}Y_{0.55}HfO_3$, $Li_{0.34}Sc_{0.55}HfO_3$, or a combination thereof.

According to an embodiment, the ionic conductivity of the solid electrolyte at 25° C. is, for example, about $1 \times 10^{-6}$ Siemens per centimeter (S/cm) or more, about $3 \times 10^{-6}$ S/cm or more, or about $3 \times 10^{-6}$ S/cm to about $2 \times 10^{-5}$ S/cm, e.g., about $1 \times 10^{-6}$ S/cm to about $2 \times 10^{-5}$ S/cm. The internal resistance of a lithium air battery containing the solid electrolyte is further reduced when the solid electrolyte has such high ion conductivity.

Pellet density is determined by dividing a mass by a volume, determined e.g., by an Archimedes' method or by measuring the height and diameter of a cylindrical pellet of the ion conductor, e.g., when compressed to 1000 kilograms per square centimeter. The pellet density of the solid electrolyte is about 4 grams per cubic centimeter (g/cc) to about 7.5 g/cc, about 4.5 g/cc to about 7.3 g/cc, about 4.8 g/cc to about 7.2 g/cc, about 5 g/cc to about 7.5 g/cc, or about 5.5 g/cc to about 7.0 g/cc. When the pellet density is within this range, the solid electrolyte is in a compact state, and thus blocks moisture or air from entering the solid electrolyte, which allows for increased ion conductivity.

The solid electrolyte may be present in the form of a particle. The solid electrolyte particle may have an average particle diameter of about 5 nanometers (nm) to about 500 micrometers (μm), about 100 nm to about 15 μm, or about 300 nm to about 10 μm, and have a specific surface area of about 0.01 square meters per gram ($m^2/g$) to about 1000 $m^2/g$, about 0.5 $m^2/g$ to about 100 $m^2/g$, about 1 $m^2/g$ to about 80 $m^2/g$, about 2 $m^2/g$ to about 70 $m^2/g$, or about 5 $m^2/g$ to about 50 $m^2/g$. See, E. P. Barrett, L. G. Joyner, P. P. Halenda, "The determination of pore volume and area distributions in porous substances. I. Computations from nitrogen isotherms," J. Am. Chem. Soc. (1951), 73, 373-380, the content of which is incorporated herein by reference in its entirety.

When the average particle diameter of the solid electrolyte particles is within the above range, a solid electrolyte having a dense film state and a desired pellet density may be prepared.

According to an embodiment, a method of preparing a solid electrolyte is described herein.

A precursor mixture for preparing a solid electrolyte is provided. The precursor mixture may be prepared, previously prepared, or purchased.

A lithium precursor, an M precursor, and a hafnium precursor may be mixed to provide the precursor mixture.

Subsequently, the precursor mixture is heat-treated to prepare a solid electrolyte including an oxide represented by Formula 1. M of the M precursor is the same as that defined in Formula 1.

If desired, a solvent may be added to the mixture.

Any suitable solvent may be used as long as it may suitably dissolve or disperse the lithium precursor, the M precursor, and the hafnium precursor. The solvent may be, for example, ethanol, water, ethylene glycol, isopropanol, or a combination thereof.

The mixing may be carried out using a method such as milling, blending or stirring. The milling may be performed by ball mill, mortar, sieve, attrition mill, disk mill, jet mill, jaw crusher, crusher, or a combination thereof.

Subsequently, the mixture is heat-treated.

The heat-treating may comprise a primary heat-treating. In the primary heat-treating of the mixture, the temperature is increased at a rate of about 1 degree Celsius per minute (° C./min) to about 10° C./min, and the primary heat-treatment temperature is about 400° C. to about 950° C. or about 600° C. to about 950° C. When the temperature increase rate is within the above range in the primary heat treatment, heat treatment may be sufficiently performed to obtain a solid electrolyte having a desired crystal structure after a secondary heat treatment process to be described later.

The primary heat-treatment may be carried out in an inert gas, oxygen, or oxidative gas atmosphere. Air is mentioned. The inert gas atmosphere may include argon, helium, nitrogen, or a combination thereof. A primary heat-treatment time can be selected based on the primary heat-treatment temperature, and is, for example, about 1 hour to about 48 hours, about 1 hours to about 10 hours, or about 2 hours to about 7 hours.

The oxidative gas atmosphere may be formed using air or oxygen.

Each of the hafnium precursor and the M precursor is hafnium or an M containing oxide, hafnium or an M containing carbonate, hafnium or an M containing chloride, hafnium or an M containing phosphate, hafnium or an M containing hydroxide, hafnium or an M containing nitrate, or a combination thereof, and is, for example, hafnium oxide, lanthanum oxide, barium oxide, calcium oxide, magnesium oxide, or a combination thereof.

The content of the lithium precursor, the hafnium precursor, and the M precursor is stoichiometrically selected to obtain the oxide represented by Formula 1.

Subsequently, the heat-treated precursor mixture may be pulverized to obtain a pulverized product. The pulverized product may be, for example, a powder. The pulverized product (e.g, a powder particle) obtained by pulverizing may comprise particles having a size of 10 μm or less, e.g., about 0.1 μm to about 10 μm. When the size of the particles is within the above range, pulverizing and mixing may be sufficiently performed because the size thereof is small, so that the formation of perovskite crystal phase is easily obtained. As used herein, the "size" refers to an average diameter when particles are spherical, and refers to a major axis length when particles are non-spherical. The size may be measured using an electron scanning microscope or by a particle size analyzer using light scattering, for example.

An additive may be added to the heat-treated precursor mixture. As the additive, LiF, LiCl, $Al_2O_3$, $Li_3BO$, or a combination thereof may be used. The additive serves to control the size of grain or control the ion conductivity of a grain boundary. When this additive is added, the composition of the oxide is not substantially changed, and the pellet density or ion conductive characteristics thereof may be improved. The content of the additive is about 0.1 parts by weight to about 10 parts by weight, about 0.5 parts by weight to about 10 parts by weight, or about 1 part by weight to about 5 parts by weight, based on 100 parts by weight of the heat-treated precursor mixture.

When the aforementioned additive is added, Al, F, B, Cl, or a combination thereof may be present in the finally obtained oxide. Here, Al may be present in the finally obtained oxide when $Al_2O_3$ is used as the additive, and F may be present in the finally obtained oxide when LiF is used as the additive. B may be present in the finally obtained oxide when $Li_3BO_3$ is used as the additive, and Cl may be preset in the finally obtained oxide when LiCl is used as the additive. According to an embodiment, the content of Al, F, B, Cl, or a combination thereof, in the oxide is about 10 parts by weight or less, about 0.0001 parts by weight to about 8 parts by weight, about 0.001 parts by weight to about 5 parts by weight, about 0.001 parts by weight to about 3 parts by weight, about 0.001 parts by weight to about 2 parts by weight, about 0.001 parts by weight to about 1 part by weight, about 0.01 parts by weight to about 0.5 parts by weight, about 0.01 parts by weight to about 3 parts by weight, or about 0.1 parts by weight to about 2 parts by weight, based on 100 parts by weight of the total weight of the oxide.

The method may comprise a secondary heat-treatment of the pulverized heat-treated precursor mixture, wherein the secondary heat-treatment may comprise heat-treating with a temperature increases of about 1° C./min to about 10° C./min. The secondary heat-treatment may comprise heat-treating at about 500° C. to about 1600° C., about 600° C. to about 1500° C., about 600° C. to about 1300° C., or about 700° C. to about 1200° C. The secondary heat-treating may comprise heat-treating in a mixed gas including about 1 volume percent (vol %) to about 10 vol % of a reducing gas and about 90 vol % to about 99 vol % of an inert gas, based on a total amount of a mixed gas. For example, the secondary heat-treatment may be carried out under a mixed gas including about 3 vol % to about 8 vol % of a reducing gas and about 92 vol % to about 97 vol % of an inert gas. When the secondary heat-treatment is carried out under such a gas atmosphere, a solid electrolyte containing an oxygen deficient oxide may be obtained.

The reducing gas is, for example, hydrogen.

According to an embodiment, the secondary heat-treatment may be carried out at a temperature that is greater than the primary heat-treatment temperature. Before secondary heat-treating the pulverized heat-treated precursor mixture, as described above, the pulverized heat-treated precursor mixture may be pressed to be made into a pellet. When the secondary heat-treatment is carried out on the pellet, the diffusion distance of a material being heat-treated is shortened, such that a desired solid electrolyte may be easily prepared. When the secondary heat-treatment proceeds with a powder or particle, i.e., not in the pellet form, the oxide of Formula 1 may be made, but a longer heat-treatment time and a higher temperature may be used, because the diffusion distance is increased in the powder particle compared to the diffusion distance in the pellet form.

The secondary heat-treatment may be determined by the valence or oxidation number of desired M, and may be carried out under an oxidative gas atmosphere, a reducing gas atmosphere, or an inert gas atmosphere. The oxidative gas atmosphere may be formed using air or oxygen, the reducing gas atmosphere may be formed using a reducing gas such as hydrogen, and the inert gas atmosphere may be formed using an inert gas such as nitrogen, argon, or helium.

The secondary heat-treatment time may be selected depending on the secondary heat-treatment temperature, and is, for example, about 1 hour to about 50 hours or about 6 hours to about 48 hours.

After the secondary heat-treatment, the oxide of Formula 1 is formed. When the temperature increase rates during the primary heat-treatment and the secondary heat-treatment are within the above ranges, each heat-treatment sufficiently proceeds, so that not only a desired crystal structure is formed but also synthesis time is short and thus economical.

According to an embodiment, the solid electrolyte may be used in a metal air battery, for example, a lithium air battery. Further, the solid electrolyte may be used as an electrolyte of an all-solid battery. Also, the solid electrolyte may be used as an electrolyte of a lithium battery. The solid electrolyte may be used in the production of a cathode and an anode of a battery, and may also be used in a surface coating of a cathode or an anode.

Figure 5:
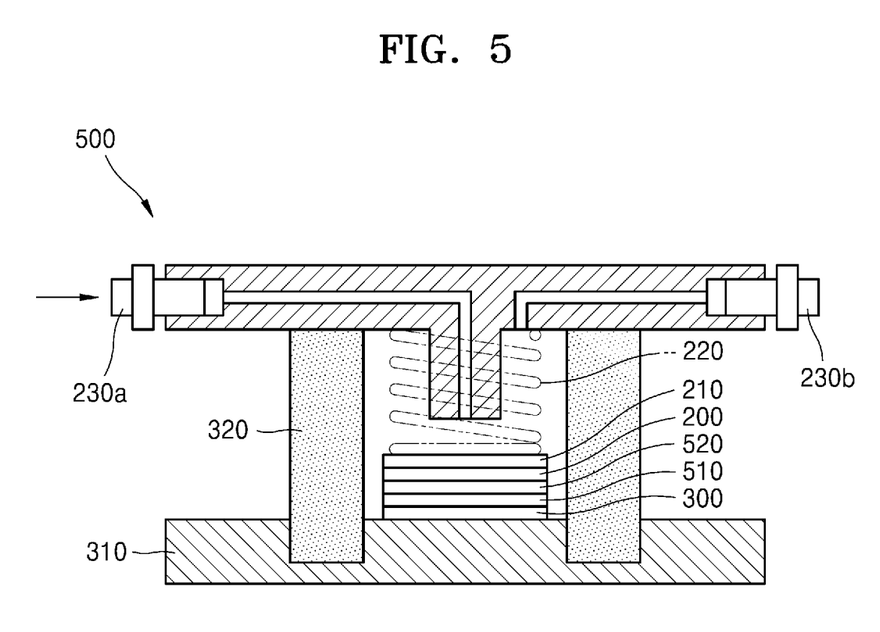
FIG. 5, according to an embodiment, is a schematic view illustrating a lithium air battery.

The surface coating may be a protection layer. Referring to FIG. 5, a lithium air battery 500 may include the protection layer 520 that may comprise the solid electrolyte and may be disposed on the cathode 200. The lithium air battery 500 may include the protection layer 510 that comprises the solid electrolyte and may be disposed on the anode.

When applying the protective layer, other electrolytes may be used together with the solid electrolyte according to one embodiment. Other electrolytes include, for example, liquid electrolytes, gel electrolytes, polymer electrolytes, ceramic electrolytes, organic/inorganic composite electrolytes, or combinations thereof.

According to an aspect, an electrochemical device including the solid electrolyte is provided. Since the electrochemical device according to an embodiment includes the solid electrolyte chemically stable and transferring both ions and electrons, stability to moisture and strong base is improved, and thus the deterioration of the electrochemical device may be efficiently suppressed. The electrochemical device is, but is not limited to, a battery, an accumulator, a supercapacitor, a fuel cell, a sensor, or an electrochromic device. Any suitable electrochemical device may be used.

The battery is, for example, a primary battery or a secondary battery. Examples of the battery may include, but are not limited to, lithium battery and sodium battery. Any suitable battery may be used. Examples of the lithium battery may include, but are not limited to, a lithium ion battery and a lithium air battery. Any suitable lithium battery may be used. Examples of the electrochromic device may include, but are not limited to, an electrochemical mirror, an electrochemical window, and an electrochemical screen. Any electrochromic device may be used as long as it is used as an electrochromic device in the art.

The electrochemical device is, for example, a lithium metal battery using a metal such as lithium or zinc as an anode, or a lithium air battery using lithium as an anode. The lifetime of such a lithium air battery is improved.

The cathode is porous. Since the cathode is porous, air, oxygen, or a combination thereof, easily diffuses into the cathode.

According to an embodiment, a lithium air battery includes: a cathode; an anode; and the electrolyte between the cathode and the anode.

According to an embodiment, at least one of the cathode, the anode, or the electrolyte includes the solid electrolyte. The anode may include lithium.

Since the lithium air battery includes the solid electrolyte, the lithium air battery has improved stability to moisture and strong base, and improved reversibility under humidified or air conditions, thereby enabling the lithium air battery to operate more efficiently. Further, structural stability of the lithium air battery is improved, and degradation thereof is suppressed.

The lithium air battery includes a cathode, and the cathode is disposed on a cathode current collector.

The cathode may contain the solid electrolyte. The content of the solid electrolyte is about 2 parts by weight to about 70 parts by weight, about 3 parts by weight to about 70 parts by weight, about 3 parts by weight to about 60 parts by weight, or about 4 parts by weight to about 60 parts by weight, based on 100 parts by weight of the cathode.

It is also possible to introduce a pore into the cathode by introducing a pore forming agent during the production of the cathode. The cathode may be in the form of a porous pellet, a porous sheet, or the like, but the form thereof is not limited thereto, and may be formed according to a desired battery form.

The cathode is permeable to gas, such as oxygen or air. Therefore, this cathode is different from a cathode that is substantially impermeable to gas such as oxygen or air and conducts only ions. Since the cathode is porous and/or permeable to gas, oxygen and/or air easily diffuse into the cathode, and lithium ions and/or electrons easily move through the solid electrolyte included in the cathode. An electrochemical reaction of oxygen, lithium ions and electrons to easily proceeds in the cathode.

In the manufacture of the cathode, in addition to the solid electrolyte, a conductive material may be further added to further increase electron conductivity and ion conductivity.

The conductive material may be porous. The conductive material has porosity, thereby making the penetration of air easier. The conductive material may be any suitable material as the material having porosity and/or conductivity, and is, for example, a carbon-based material having porosity. Examples of the carbon-based material may include, but are limited to, carbon black, graphite, graphene, active carbon, carbon fiber, or a combination thereof. Any suitable carbon-based material may be used. The conductive material is, for example, a metallic material. Examples of the metallic material may include metal fiber, metal mesh, metal powder, or a combination thereof. Examples of the metal powder may include copper powder, silver powder, nickel, aluminum powder, or a combination thereof. The conductive material is, for example, an organic conductive material. Examples of the organic conductive material may include polyphenylene derivatives and polythiophene derivatives. The conductive materials are used alone or in combination. The cathode may include a composite conductor as the conductive material, and the cathode may further include the conductive material in addition to the composite conductor.

The cathode further includes a catalyst for oxidation/reduction of oxygen. Examples of the catalyst may include, but are not limited to, a precious metal catalyst, such as platinum, gold, silver, palladium, ruthenium, rhodium, and osmium; oxide catalysts such as manganese oxide, iron oxide, cobalt oxide, and nickel oxide; and organometallic catalysts such as cobalt phthalocyanine. Any suitable catalyst may be used.

The catalyst is supported on a carrier. Examples of the carrier may include oxide carriers, zeolite carriers, clay-based mineral carriers, and carbon carriers. The oxide carrier is an oxide carrier including Al, Si, Zr, Ti, Ce, Pr, Sm, Eu, Tb, Tm, Yb, Sb, Bi, V, Cr, Mn, Fe, Co, Ni, Cu, Nb, Mo, W, or a combination thereof. Examples of the oxide carrier include alumina, silica, zirconium oxide, and titanium dioxide. Examples of the carbon carrier may include, but are not limited to, a carbon black such as ketjen black, acetylene black, channel black, and lamp black; graphite such as natural graphite, artificial graphite, and expanded graphite; active carbon; and carbon fiber. Any suitable carbon carrier may be used.

The cathode further includes a binder. The binder includes a thermoplastic resin or a thermosetting resin. Examples of the binder may include, but are limited to, polyethylene, polypropylene, polytetrafluoroethylene (PTFE), polyvinylidene fluoride (PVDF), styrene-butadiene rubber, a tetrafluoroethylene-perfluoroalkylvinyl ether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a vinylidene fluoride-pentafluoro propylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoroethylene copolymer, and an ethylene-acrylic acid copolymer, which may be used alone or in combination. Any suitable binder may be used.

The cathode is manufactured by mixing a conductive material, an oxygen oxidation/reduction catalyst, and a binder, to obtain a mixture by adding an appropriate solvent to the mixture to prepare a cathode slurry, and then applying the cathode slurry onto the surface of a substrate and drying the applied cathode slurry or pressing the cathode slurry onto the substrate to improve electrode density. The substrate is, for example, a cathode current collector, a separator, or a solid electrolyte film. The cathode current collector is, for example, a gas diffusion layer.

The conductive material includes the solid electrolyte, and the oxygen oxidation/reduction catalyst and the binder in the cathode may be omitted depending on the type of cathode required.

The lithium air battery includes an anode. According to an embodiment, the anode may include the solid electrolyte.

The anode contains lithium.

The anode is, for example, a lithium metal thin film or a lithium-based alloy thin film. The lithium-based alloy is, for example, an alloy of lithium with aluminum, tin, magnesium, indium, calcium, titanium, or vanadium.

The lithium air battery includes an electrolyte disposed between the cathode and the anode.

The electrolyte may be, for example, the solid electrolyte including an oxide represented by Formula 1.

According to an embodiment, the electrolyte may further include a solid electrolyte, a gel electrolyte, or a liquid electrolyte, in addition to the solid electrolyte. The additional solid electrolyte, the gel electrolyte and the liquid electrolyte are not particularly limited. Any suitable electrolyte may be used.

The additional solid electrolyte includes, but is not limited to, a solid electrolyte including an ion conductive inorganic material, a solid electrolyte including a polymeric ionic liquid (PIL) and a lithium salt, a solid electrolyte including an ion conductive polymer and a lithium salt, and a solid electrolyte including an electron conductive polymer. Any suitable solid electrolyte may be used.

The ion conductive inorganic material includes, but is not limited to, a glass or amorphous metal ion conductor, a ceramic active metal ion conductor, a glass ceramic active metal ion conductor, or a combination thereof. Any suitable ion conductive inorganic material may be used. The ion conductive inorganic material is in the form of, for example, a particle or a sheet.

Examples of the ion conductive inorganic material may include $BaTiO_3$, $Pb(Zr_aTi_{1-a})O_3$ (PZT) where $0 \leq a \leq 1$, $Pb_{1-x}La_xZr_{1-y}Ti_yO_3$ (PLZT) ($0 \leq x < 1$, $0 \leq y < 1$), $Pb(Mg_{1/3}Nb_{2/3})O_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O$, $Al_2O_3$, $TiO_2$, $SiO_2$, $SiC$, lithium phosphate ($LiPO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $Li_{1+x+y}(Al_aGa_{1-a})_x(Ti_bGe_{1-b})_{2-x}Si_yP_{3-y}O_{12}$ ($0 \leq x \leq 1$, $0 \leq y \leq 1$, $0 \leq a \leq 1$, $0 \leq b \leq 1$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$-based glass ($Li_xSi_yS_z$, $0<x<3$, $0<y<2$, $0<z<4$), $P_2S_5$-based glass ($Li_xP_yS_z$, $0<x<3$, $0<y<3$, $0<z<7$), $Li_2O$, $LiF$, $LiOH$, $Li_2CO_3$, $LiAlO_2$, $Li_2O$—$Al_2O$—$SiO_2$—$P_2O$—$TiO_2$—$GeO_2$-based ceramics, garnet-based ceramics ($Li_{3+x}La_3M_2O_{12}$(M=Te, Nb, Zr, $0 \leq x \leq 5$)), or a combination thereof.

The polymeric ionic liquid (PIL) includes i) an ammonium-based ion, a pyrrolidinium-based ion, a pyridinium-based ion, a pyrimidinium-based ion, an imidazolium-based ion, a piperdinium-based ion, a pyrazolium-based ion, an oxazolium-based ion, a pyrdazinium-based ion, a phosphonium-based ion, a sulfonium-based ion, a triazolium-based ion, or a combination thereof, and ii) $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $SO_4^-$, $CF_3SO_3^-$, $(C_2F_5SO_2)_2N^-$, $(C_2F_5SO_2)(CF_3SO_2)N^-$, $NO_3^-$, $Al_2Cl_7^-$, $CH_3COO^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2$ (CF$_3$)$_2$CO$^-$, (CF$_3$SO$_2$)$_2$CH$^-$, (SF$_5$)$_3$C$^-$, (O(CF$_3$)$_2$C$_2$(CF$_3$)$_2$O)$_2$PO$^-$, or a combination thereof. Examples of the polymeric ionic liquid (PIL) may include poly(diallyldimethylammonium) TFSI, poly(1-allyl-3-methylimidazolium bis(trifluoromethanesulfonyl)imide), or poly((N-methyl-N-propylpipeidiniumbis(trifluoromethanesulfonyl)imide).

The ion conductive polymer includes a repeating unit derived from an ether-based monomer, an acrylic monomer, a methacrylic monomer, a siloxane-based monomer, or a combination thereof.

Examples of the ion conductive polymer may include, but are not limited to, polyethylene oxide (PEO), polyvinyl alcohol (PVA), polyvinylpyrrolidone (PVP), polyvinyl sulfone, polypropylene oxide (PPO), polymethyl methacrylate, polyethyl methacrylate, polydimethylsiloxane, polyacrylic acid, polymethacrylic acid, polymethylacrylate, polyethylacrylate, poly2-ethylhexyl acrylate, polybutyl methacrylate, poly-2-ethylhexyl methacrylate, polydecyl acrylate, polyethylene vinyl acetate, phosphate ester polymer, polyester sulfide, polyvinylidene fluoride (PVF), or Li-substituted Nafion. Any suitable ion conductive polymer may be used.

Examples of the electron conductive polymer may include, but are not limited to, a polyphenylene derivative or a polythiophene derivative. Any suitable electron conductive polymer may be used.

The gel electrolyte is obtained by adding a low-molecular-weight solvent to the solid electrolyte disposed between the cathode and the anode. The gel electrolyte is obtained by adding a solvent, an oligomer, or a combination thereof, which is a low-molecular-weight compound, to a polymer.

The liquid electrolyte includes a solvent and a lithium salt.

The solvent may include, but is not limited to, an organic solvent, an ionic liquid, an oligomer, or a combination thereof. Any suitable solvent may be used that is a liquid at room temperature (25° C.).

The organic solvent includes an ether-based solvent, a carbonate-based solvent, an ester-based solvent, a ketone-based solvent, or a combination of the foregoing. The organic solvent may include, but is not limited to, propylene carbonate, ethylene carbonate, fluoroethylene carbonate, vinyl ethylene carbonate butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, dimethylacetamide, dimethylsulfoxide, dioxane, 1,2-dime Methoxyethane, sulfolane, dichloroethane, chlorobenzene, nitrobenzene, succinonitrile, diethylene glycol dimethyl ether (DEGDME), tetraethylene glycol dimethyl ether (TEGDME), polyethylene glycol dimethyl ether (PEGDME, Mn=~500), dimethyl ether, diethyl ether, dibutyl ether, dimethoxyethane, 2-methyltetrahydrofuran, tetrahydrofuran, or a combination thereof. Any suitable organic solvent may be used as long as it is a liquid at room temperature.

The ionic liquid (IL) includes i) an ammonium-based ion, a pyrrolidinium-based ion, a pyridinium-based ion, a pyrimidinium-based ion, an imidazolium-based ion, a piperidinium-based ion, a pyrazolium-based ion, an oxazolium-based ion, a pyridazinium-based ion, a phosphonium-based ion, a sulfonium-based ion, a triazolium-based ion, or a combination thereof, and ii) BF$_4^-$, PF$_6^-$, AsF$_6^-$, SbF$_6^-$, AlCl$_4^-$, HSO$_4^-$, ClO$_4^-$, CH$_3$SO$_3^-$, CF$_3$CO$_2^-$, (CF$_3$SO$_2$)$_2$N$^-$, Cl$^-$, Br$^-$, I$^-$, SO$_4^-$, CF$_3$SO$_3^-$, (C$_2$F$_5$SO$_2$)$_2$N$^-$, (C$_2$F$_5$SO$_2$)(CF$_3$SO$_2$)N$^-$, NO$_3^-$, Al$_2$Cl$_7^-$, CH$_3$COO$^-$, (CF$_3$SO$_2$)$_3$C$^-$, (CF$_3$)$_2$PF$_4^-$, (CF$_3$)$_3$PF$_3^-$, (CF$_3$)$_4$PF$_2^-$, (CF$_3$)$_5$PF$^-$, (CF$_3$)$_6$P$^-$, SF$_5$CF$_2$SO$_3^-$, SF$_5$CHFCF$_2$SO$_3^-$, CF$_3$CF$_2$(CF$_3$)$_2$CO$^-$, (CF$_3$SO$_2$)$_2$CH$^-$, (SF$_5$)$_3$C$^-$, (O(CF$_3$)$_2$C$_2$(CF$_3$)$_2$O)$_2$PO$^-$, or a combination thereof.

The lithium salt may include, but is not limited to lithium bis(trifluoromethanesulfonyl)imide ((LiN(SO$_2$CF$_3$)$_2$, LiTFSI), LiPF$_6$, LiBF$_4$, LiAsF$_6$, LiClO$_4$, LiNO$_3$, (lithium bis(oxalato) borate (LiBOB), LiCF$_3$SO$_3$, LiN(SO$_2$C$_2$F$_5$)$_2$, LiN(SO$_2$F)$_2$, LiC(SO$_2$CF$_3$)$_3$, LiN(SO$_3$CF$_3$)$_2$, LiC$_4$F$_9$SO$_3$, LiAlCl$_4$, CF$_3$SO$_3$Li, or a combination thereof. Any suitable lithium salt may be used. The concentration of the lithium salt is, for example, about 0.01 M to about 5.0 M.

The lithium air battery further includes a separator between the cathode and the anode. The separator is not limited as long as it has a composition capable of enduring the range of use of the lithium air battery. Examples of the separator may include a polymer non-woven fabric such as a polypropylene non-woven fabric or a polyphenylene sulfide non-woven fabric, a porous film of olefin resin such as polyethylene or polypropylene, a glass fiber, or a combination thereof.

The electrolyte has a structure in which a separator is impregnated with a solid polymer electrolyte or a structure in which a separator is impregnated with a liquid electrolyte. The electrolyte having a structure in which a separator is impregnated with a solid polymer electrolyte is prepared by placing a solid polymer electrolyte film on one surface or more surfaces of the separator and roll-pressing the solid polymer electrolyte film. The electrolyte having a structure in which a separator is impregnated with a liquid electrolyte is prepared by injecting a liquid electrolyte containing a lithium salt into the separator.

The lithium air battery is prepared by placing an anode on one surface in a case, placing an electrolyte layer on the anode, placing a cathode on the electrolyte layer, placing a porous cathode current collector on the cathode, placing a pushing member on the porous cathode current collector to transfer air to an air electrode, and pushing the pushing member to fix the cell. The case may be separated into an upper portion that contacts the anode and a lower portion that contacts the air electrode, and may be provided with an insulating resin between the upper portion and the lower portion to electrically insulate the cathode and the anode from each other.

The lithium air battery may be used in both primary and secondary batteries. The shape of the lithium air battery is not particularly limited, and is, for example, a coin shape, a button shape, a sheet shape, a laminate shape, a cylinder shape, a flat shape, or a horn shape. The lithium air battery may be a medium-sized battery or a large-sized battery for use in electric vehicles.

Figure 4:
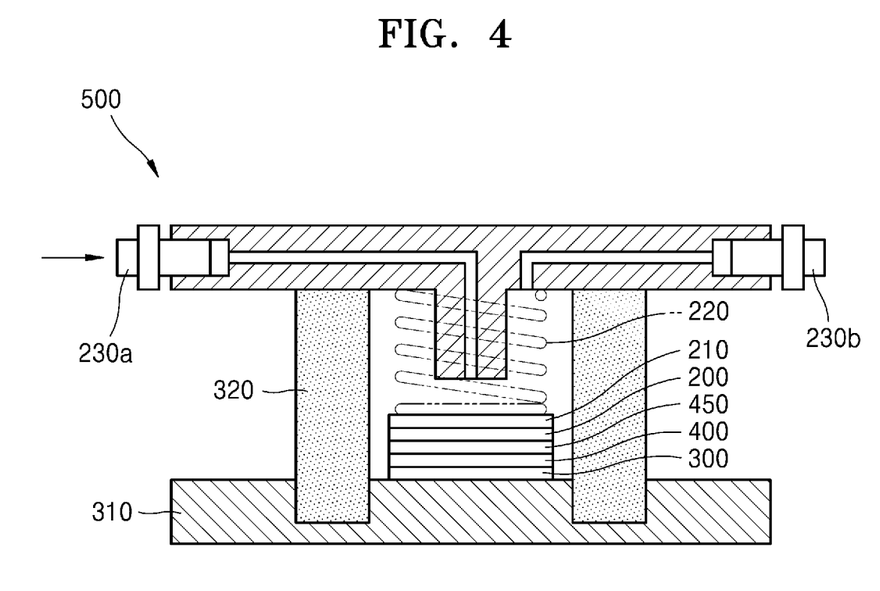
FIG. 4, according to an embodiment, is a schematic view illustrating a lithium air battery.

FIG. 4 is, a schematic cross-sectional view illustrating a structure of a lithium air battery according to an embodiment.

Referring to FIG. 4, a lithium air battery 500 has a structure in which a first electrolyte 400 is disposed between a cathode 200 containing oxygen as an active material adjacent to a first current collector 210 and an anode 300 containing lithium adjacent to a second current collector 310. The first electrolyte 400 is a separator impregnated with a liquid electrolyte.

A second electrolyte 450 may be provided between the cathode 200 and the first electrolyte 400. The second electrolyte 450 is a lithium ion conductive solid electrolyte film, and may use the solid electrolyte according to the embodiment. The first current collector 210 is porous, and may also serve as a gas diffusion layer capable of diffusing air as porosity. A pushing member 220 capable of transferring air to the cathode 200 is disposed on the first current collector 210.

Air is supplied to an air inlet 230a and discharged to an air outlet 230b. The lithium air battery 500 may be accommodated in a stainless-steel container. In FIG. 4, a reference number 320 denotes an insulating resin case 320.

The "air" of the lithium air battery is not limited to atmospheric air, but may include a combination of gases containing oxygen, or pure oxygen gas. This broad definition of the term "air" applies to all applications, for example air cells and air cathodes.

Hereinafter, the present disclosure will be described in detail with reference to Examples and Comparative Examples. However, these Examples are provided for only illustrative purposes, and the scope of the present disclosure is not limited thereto.

EXAMPLES

Preparation of Solid Electrolyte Including an Oxide

Comparative Example 1: $Li_2HfO_3$ $Li_2CO_3$, which is a lithium precursor, and $HfO_2$, which is a hafnium precursor, were mixed according to the composition ratio of $Li_2HfO_3$, and ethanol was added thereto and mixed to obtain a precursor mixture. The precursor mixture was put into a ball-milling apparatus, and was pulverized and mixed for 4 hours. The resulting mixture was dried, heated to 650° C. at a temperature increase rate of about 5° C./min, and then primarily heat-treated for 12 hours under an air atmosphere to obtain powder.

The powder obtained by primary heat-treatment was ground, and then pressed to prepare an ion conductor pellet having a diameter of about 1.3 cm and a height of about 0.5 cm. Secondary heat-treatment of the pellet was carried out at 700° C. for 12 hours under an air or oxygen atmosphere to obtain a solid electrolyte including an oxide. When the secondary heat-treatment was raised up to 700° C. the temperature was increased at about 5° C./min.

Example 1

$Li_2CO_3$, which is a lithium precursor, $HfO_2$, which is a hafnium precursor, and strontium oxide (SrO), which is a M precursor, were mixed according to the composition ratio of $Li_{0.3}Sr_{0.6}HfO_{2.75}$, and ethanol was added thereto and mixed to obtain a precursor mixture. The precursor mixture was put into a ball-milling apparatus, and was pulverized and mixed for 4 hours. The resulting mixture was dried, heated to 900° C. at a temperature increase rate of about 5° C./min, and then primarily heat-treated for 6 hours under an argon atmosphere to obtain powder.

The powder obtained by primary heat-treatment was ground, and then LiF was added to the ground powder as an additive. The content of LiF is 2 parts by weight based on 100 parts by weight of the ground powder. This powder was pressed to prepare an ion conductor pellet having a diameter of about 1.3 cm and a height of about 0.5 cm. Secondary heat-treatment of the ion conductor pellet was carried out at 1000° C. for 6 hours under a mixed gas atmosphere including 3 vol % of hydrogen and 97 vol % of argon to obtain a solid electrolyte including an oxide. When heat up to 1000° C. for secondary heat-treatment, the temperature was increased at about 5° C./min.

Examples 2 to 11

Solid electrolytes were obtained in the same manner as in Example 1, except that the type and content of precursors used were varied to obtain oxides having the compositions shown in Table 1. The additives added to the powder obtained by primary heat-treatment are also described in Table 1.

TABLE 1

| Example | Composition | Primary heat-treatment temperature (° C.) and time (hr) | Secondary heat-treatment temperature (° C.) and time (hr) | M1 precursor | Additive |
| --- | --- | --- | --- | --- | --- |
| Example 1 | $Li_{0.3}Sr_{0.6}HfO_{2.75}$ | 900° C., 6 hr | 1000° C., 6 hr | Strontium oxide (SrO) | LiF |
| Example 2 | $Li_{0.3}Sr_{0.4}HfO_{2.55}$ | 900° C., 6 hr | 1000° C., 6 hr | Strontium oxide (SrO) | LiF |
| Example 3 | $Li_{0.3}Ba_{0.6}HfO_{2.75}$ | 900° C., 6 hr | 1000° C., 6 hr | Barium oxide (BaO) | LiF |
| Example 4 | $Li_{0.3}Ca_{0.6}HfO_{2.75}$ | 900° C., 6 hr | 1000° C., 6 hr | Calcium oxide (CaO) | LiF |
| Example 5 | $Li_{0.34}La_{0.55}HfO_3$ | 900° C., 6 hr | 1000° C., 6 hr | $La_2O_3$ | LiF |
| Example 6 | $Li_{0.3}Sr_{0.6}HfO_{2.75}$ | 900° C., 6 hr | 1000° C., 6 hr | SrO | $Al_2O_3$ |
| Example 7 | $Li_{0.3}Sr_{0.4}HfO_{2.55}$ | 900° C., 6 hr | 1000° C., 6 hr | SrO | LiCl |
| Example 8 | $Li_{0.3}Sr_{0.4}HfO_{2.55}$ | 900° C., 6 hr | 1000° C., 6 hr | SrO | $Al_2O_3$ |
| Example 9 | $Li_{0.3}Sr_{0.6}HfO_{2.75}$ | 900° C., 6 hr | 1000° C., 6 hr | SrO | $Li_3BO_3$ |
| Example 10 | $Li_{0.3}Sr_{0.4}HfO_{2.55}$ | 900° C., 6 hr | 1000° C., 6 hr | SrO | $Li_3BO_3$ |
| Example 11 | $Li_{0.3}Sr_{0.6}HfO_{2.75}$ | 900° C., 6 hr | 1000° C., 6 hr | SrO | LiCl |
| Comparative Example 1 | $Li_2HfO_3$ | 650° C., 12 hr | 700° C., 12 hr | — | None |

Manufacture Example 1: Manufacture of lithium air battery 40 parts by weight of carbon (Super-P), 10 parts by weight of polytetrafluoroethylene (PTFE), and 50 parts by weight of NMP (N-methylpyrrolidone) were mixed to prepare a cathode slurry, and then the cathode slurry was applied and roll-pressed to obtain a cathode composite sheet. The cathode composite sheet was pressed onto a stainless steel mesh, and then vacuum-dried in an oven at 100° C. for 120 minutes to obtain a cathode.

The center of a 5 cm×5 cm an aluminum film (polypropylene coated aluminum film, thickness 200 μm) was perforated to form a hole, and the hole was clogged with the solid electrolyte of Example 1 using an adhesive to prepare a first aluminum film provided with the solid electrolyte of Example 1. The solid electrolyte of Example 1 had a size of 1.4 cm×1.4 cm. Next, a new second aluminum film having a size of 5 cm×5 cm, a copper current collector (thickness: 20 μm), a lithium foil (1.4 cm×1.4 cm, thickness: 100 μm), a separator (Celgard-3501, manufactured by Celgard Corporation) having a thickness of 25 μm and made of a polypropylene impregnated with an electrolyte solution (including 1M LiTFSI dissolved in propylene carbonate (PC)), and the prepared first aluminum film were laminated, heated in vacuum, and adhered to obtain an aluminum pouch type lithium anode.

The lithium anode was provided in a stainless steel case, and the cathode provided with the separator (Celgard-3501, manufactured by Celgard Corporation) having a thickness of 25 μm and made of a polypropylene was set to face the anode. Subsequently, a porous gas diffusion layer made of carbon fiber was placed on the cathode, a foamed nickel plate was placed on the porous gas diffusion layer, and a pushing member for transferring air to the cathode was pressed onto the foamed nickel plate to manufacture a lithium air battery.

Manufacture Examples 2 to 11: Manufacture of Lithium Air Batteries

Lithium air batteries were manufactured in the same manner as in Manufacture Example 1, except that each of the solid electrolytes of Examples 2 to 11 was used instead of the solid electrolyte of Example 1.

Comparative Manufacture Example 1: Manufacture of Lithium Air Battery

A lithium air battery was manufactured in the same manner as in Manufacture Example 1, except that the solid electrolyte of Comparative Example 1 was used instead of the solid electrolyte of Example 1.

Evaluation Example 1: X-Ray Diffraction Analysis

X-ray diffraction (XRD) analysis of the solid electrolytes of Examples 1 to 11 and Comparative Example 1 was carried out. XRD analysis was carried out using a D8 Advance of Bruker Corporation, and Cu Kα radiation was used.

Figure 2:
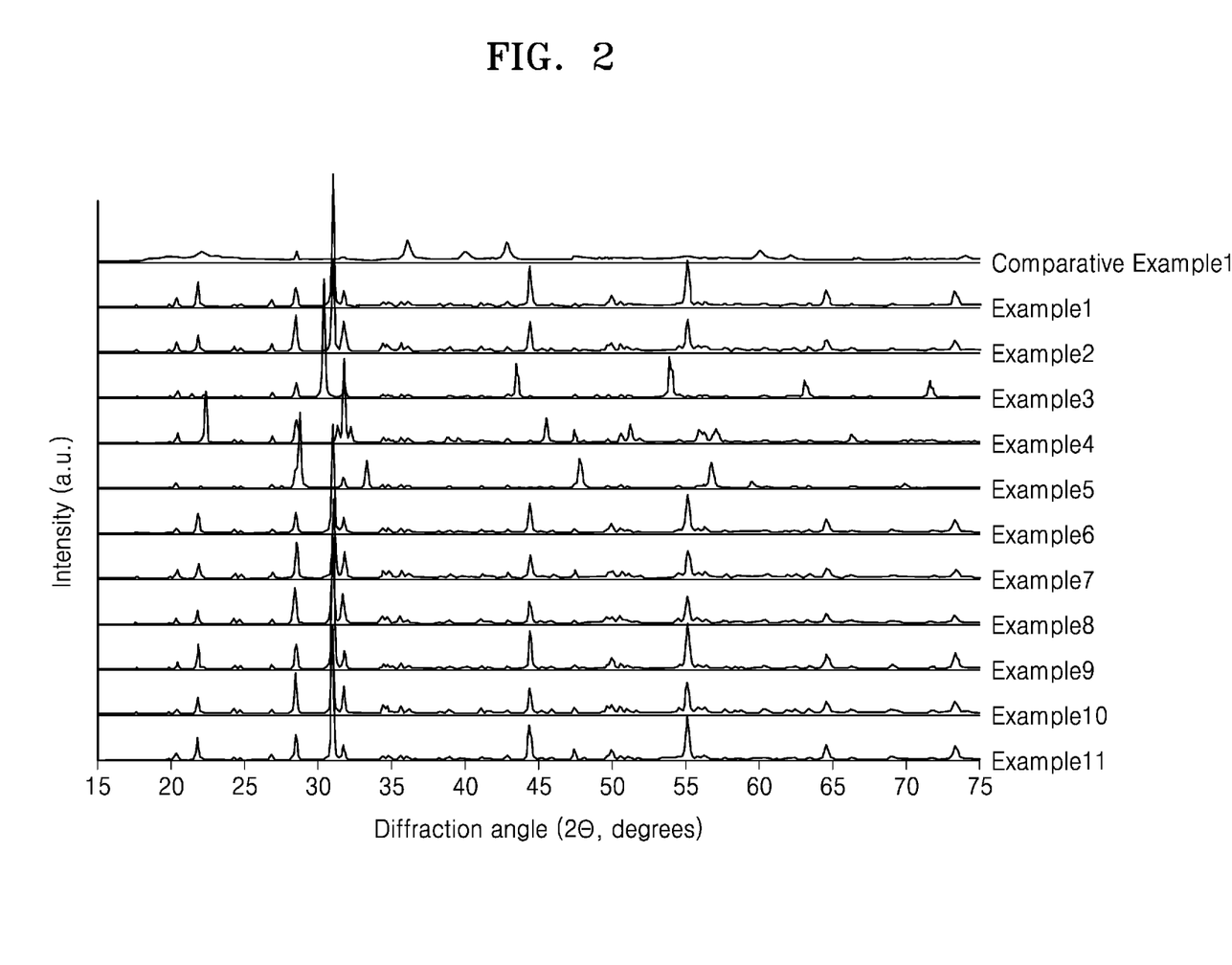
FIG. 2 is a graph of intensity in arbitrary units (a.u.) versus diffraction angle (°2θ) and illustrates spectra of solid electrolytes of Examples 1 to 11 and Comparative Example 1, analyzed by X-ray diffraction (XRD) using Cu Kα radiation.

Through the XRD analysis, the ratio (IA/IB) of intensity (IA) of a first diffraction peak in an area where a diffraction angle 2θ is 31.0°2θ±1.0°2θ to intensity (IB) of a second diffraction peak in an area where a diffraction angle 2θ is 21.8°2θ±1.0°2θ is represented by Equation 1, and the results thereof are shown in Table 2 and FIG. 2.

$IA/IB = \{$(intensity of diffraction peak in area where diffraction angle 2θ is 31.0°2θ±1.0°2θ)/(intensity of diffraction peak in area where diffraction angle 2θ is 21.8°2θ±1.0°2θ)$\}$    Equation 1

TABLE 2

| Example | IA/IB |
|---|---|
| Example 1 | 5.2 |
| Example 2 | 5.2 |
| Example 3 | 21.3 |
| Example 4 | 1.6 |
| Example 5 | 4.1 |
| Example 6 | 5.3 |
| Example 7 | 4.9 |
| Example 8 | 5.2 |
| Example 9 | 5.0 |
| Example 10 | 5.3 |
| Example 11 | 5.3 |
| Comparative Example 1 | 0.5 |

As shown in FIG. 2 and Table 2, it was found that in the solid electrolytes containing the oxides of Examples 1 to 11, the IA/IB is greater than 1, but in the solid electrolyte containing the oxide of Comparative Example 1, the IA/IB is less than 1. As shown in FIG. 2, the solid electrolytes containing the oxides of Examples 1 to 11 contains $HfO_2$, which is a minor phase, and the characteristic peak of $HfO_2$ appears in area where diffraction angle 2θ is 21.8° 2θ±1.0°2θ

Evaluation Example 2: Ion Conductivity

The upper end surface and lower end surface of each of the ion conductor pellets prepared in Examples 1 to 11 and Comparative Example 1 were coated (deposited) with gold (Au) by sputtering, and impedances of the samples were measured by a 2-probe method using an impedance analyzer. The frequency range was 1 hertz (Hz) to 1 megahertz (MHz), and the amplitude voltage was 100 millivolts (mV). The impedances of the samples were measured at 30° C. under an air atmosphere. Resistance values were obtained from the arc of the Nyquist plot for the impedance measurement results, and ion conductivity was calculated from the resistance values.

Figure 3:
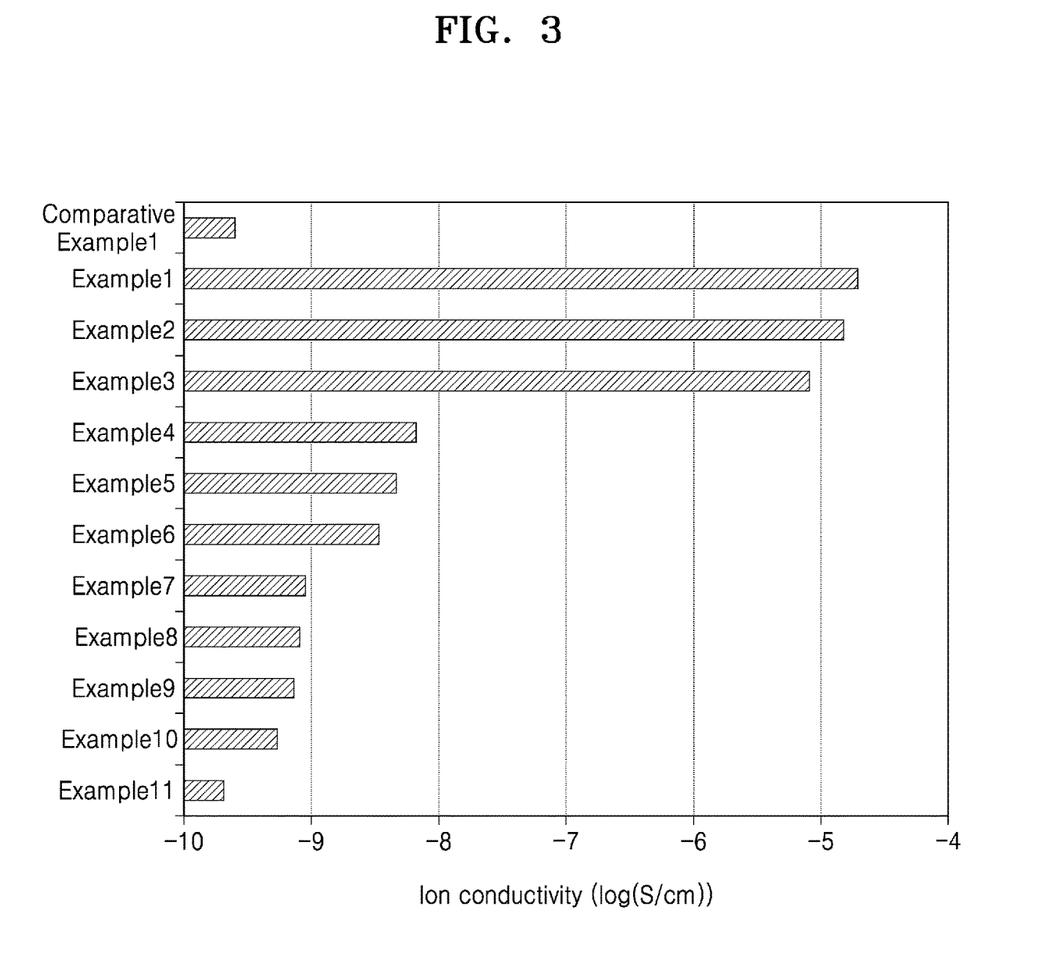
FIG. 3 is a graph illustrating log ion conductivity in Siemens per centimeter (S/cm) of solid electrolytes of Examples 1 to 11 and Comparative Example 1.

As shown in FIG. 3, it was found that the solid electrolytes of Examples 1 to 10 have improved ion conductivity as compared with the solid electrolyte of Comparative Example 1.

Further, although the ion conductor pellet of Example 11 exhibited almost the same level of ion conductivity as the ion conductor pellet of Comparative Example 1, as shown in Table 3 of Evaluation Example 3, the pellet density increased in the ion conductor pellet of Example 11 as compared with the pellet density of the ion conductor pellet of Comparative Example 1, thereby preparing a solid electrolyte in a more compact state using the ion conductor pellet of Example 11.

Evaluation Example 3: Pellet Density

The pellet density of ion conductor pellets was measured by measuring the diameter, height, and weight of the ion conductor pellets obtained in Examples 1 to 11 and Comparative Example 1. The evaluation results of the pellet density are shown in Table 3.

TABLE 3

| Example | Pellet density (g/cc) |
|---|---|
| Example 1 | 5.36 |
| Example 2 | 5.39 |
| Example 3 | 5.67 |
| Example 4 | 5.08 |
| Example 5 | 4.94 |
| Example 6 | 5.11 |
| Example 7 | 5.33 |
| Example 8 | 5.14 |
| Example 9 | 6.92 |
| Example 10 | 7.34 |
| Example 11 | 5.13 |
| Comparative Example 1 | 3.97 |

As shown in Table 3, it was found that the pellet density of the pellets of Examples 1 to 11 was improved as compared with the pellet density of the pellet of Comparative Example 1. As the pellet density is improved, amore compact solid electrolyte may be obtained. As a result, the solid electrolytes prepared using the pellets of Examples 1 to 11 had improved moisture or air blocking properties as compared with the electrolyte prepared using the pellet of Comparative Example 1.

Evaluation Example 4: Evaluation of Electrochemical Stability

After the solid electrolyte of Example 1 was pulverized to a size of about 1 μm, N-methyl-2-pyrrolidone was mixed with 85 weight percent (wt %) of the pulverized product, 10 wt % of carbon black as a conductive material, and 5 wt % of polyvinylidene fluoride (PVDF) as a binder to prepare a slurry. The slurry was applied on an aluminum foil and then dried to prepare a working electrode. A lithium metal foil was used as a counter electrode, and a separator impregnated with a liquid electrolyte (1M LiTFSI in propylene carbonate (PC)) was disposed between the working electrode and the counter electrode to prepare a half-cell.

Electrochemical Stability of layered compounds on lithium metals was evaluated over a voltage range of 2 V to 4 V (vs. Li) at a scan rate of 0.1 millivolts per second (mV/sec) by cyclic voltammetry.

As a result of evaluation, the solid electrolyte of Example 1 was electrochemically stable without overcurrent due to side reactions during 1 scan, 80 scans or 100 scans.

Evaluation Example 5: Evaluation of Charge and Discharge Characteristics of Lithium Air Battery The lithium air battery manufactured in Manufacture Example 1 was discharged up to 2.0 V (vs. Li) with a constant current of 0.01 milliamperes per square centimeter (mA/cm$^2$) under an oxygen atmosphere at 60° C. and 1 atmosphere (atm), and then charged up to 4.25 V with the same current. This charge and discharge cycle was repeatedly performed. The charge and discharge test results of each lithium air battery in the first cycle were examined.

As a result of the charge and discharge test, it was confirmed that the lithium air battery of Manufacture Example 1, employing the solid electrolyte of Example 1, was stably driven.

According to an embodiment, the solid electrolyte has improved stability in the presence of lithium, is stable against moisture in humid or atmospheric conditions, and maintains excellent ion conductivity. An electrochemical device with suppressed degradation may be manufactured when the solid electrolyte is used.

It should be understood that embodiments described herein should be considered in a descriptive sense only and not for purposes of limitation. Descriptions of features, aspects, or advantages within each embodiment should be considered as available for other similar features, aspects, or advantages in other embodiments. While one or more embodiments have been described with reference to the figures, it will be understood by those of ordinary skill in the art that various changes in form and details may be made therein without departing from the spirit and scope as defined by the following claims.

What is claimed is:

1. A solid electrolyte comprising:
an oxide represented by Formula 1, $$\text{Li}_y\text{M}_z\text{HfO}_{3-x} \qquad \text{Formula 1}$$

wherein, in Formula 1,
M is Sr, Ba, Ca, Mg, La, Ce, Pr, Gd, Y, Sc, or a combination thereof, and
$0 \leq x < 3$, $0 < y < 1$, and $0 < z < 1$.

2. The solid electrolyte of claim 1, wherein, in Formula 1, x is 0 to about 0.9.

3. The solid electrolyte of claim 1, wherein, in Formula 1, y is about 0.1 to about 0.9.

4. The solid electrolyte of claim 1, wherein, in Formula 1, z is about 0.1 to about 0.9.

5. The solid electrolyte of claim 1, wherein the oxide represented by Formula 1 is at least one selected from oxides represented by Formulae 2 to 9:

$$\text{Li}_y\text{Ba}_z\text{HfO}_{3-x} \qquad \text{Formula 2}$$

wherein, in Formula 2, $0 \leq x < 3$, $0 < y < 1$, and $0 < z < 1$ are satisfied;

$$\text{Li}_y\text{Sr}_z\text{HfO}_{3-x} \qquad \text{Formula 3}$$

wherein, in Formula 3, $0 \leq x < 3$, $0 < y < 1$, and $0 < z < 1$ are satisfied;

$$\text{Li}_y\text{Ca}_z\text{HfO}_{3-x} \qquad \text{Formula 4}$$

wherein, in Formula 4, $0 \leq x < 3$, $0 < y < 1$, and $0 < z < 1$ are satisfied;

$$\text{Li}_y\text{La}_z\text{HfO}_{3-x} \qquad \text{Formula 5}$$

wherein, in Formula 5, $0 \leq x < 3$, $0 < y < 1$, and $0 < z < 1$ are satisfied;

$$\text{Li}_y\text{Ce}_z\text{HfO}_{3-x} \qquad \text{Formula 6}$$

wherein, in Formula 6, $0 \leq x < 3$, $0 < y < 1$, and $0 < z < 1$ are satisfied;

$$\text{Li}_y\text{Pr}_z\text{HfO}_{3-x} \qquad \text{Formula 7}$$

wherein, in Formula 7, $0 \leq x < 3$, $0 < y < 1$, and $0 < z < 1$ are satisfied;

$$\text{Li}_y\text{Y}_z\text{HfO}_{3-x} \qquad \text{Formula 8}$$

wherein, in Formula 8, $0 \leq x < 3$, $0 < y < 1$, and $0 < z < 1$ are satisfied; and $$\text{Li}_y\text{Sc}_z\text{HfO}_{3-x} \qquad \text{Formula 9}$$

wherein, in Formula 9, $0 \leq x < 3$, $0 < y < 1$, and $0 < z < 1$ are satisfied.

6. The solid electrolyte of claim 5, wherein, x is 0 to about 0.9, y is about 0.1 to about 0.9, z is about 0.1 to about 0.9, and y+z<1.

7. The solid electrolyte of claim 1, wherein the oxide has a perovskite crystal structure.

8. The solid electrolyte of claim 7, wherein the oxide has a crystal structure in which Li, a vacancy, and M each independently reside in an A-site in the perovskite crystal structure of ABO$_3$, and hafnium resides in a B-site in the perovskite crystal structure of ABO$_3$.

9. The solid electrolyte of claim 7, wherein the oxide of Formula 1 is Li$_{0.3}$Sr$_{0.6}$HfO$_{2.75}$, Li$_{0.3}$Sr$_{0.4}$HfO$_{2.55}$, Li$_{0.3}$Ba$_{0.6}$HfO$_{2.75}$, Li$_{0.3}$Ba$_{0.4}$HfO$_{2.55}$, Li$_{0.3}$Ca$_{0.6}$HfO$_{2.75}$, Li$_{0.3}$Ca$_{0.4}$HfO$_{2.55}$, Li$_{0.10}$Ca$_{0.80}$HfO$_{2.85}$, Li$_{0.20}$Ca$_{0.80}$HfO$_{2.7}$, Li$_{0.25}$Ca$_{0.50}$HfO$_{2.625}$, Li$_{0.40}$Ca$_{0.20}$HfO$_{2.7}$, Li$_{0.10}$Sr$_{0.60}$HfO$_{2.85}$, Li$_{0.20}$Sr$_{0.60}$HfO$_{2.7}$, Li$_{0.25}$Sr$_{0.50}$HfO$_{2.625}$, Li$_{0.40}$Sr$_{0.20}$HfO$_{2.7}$, Li$_{0.10}$Ba$_{0.40}$HfO$_{2.75}$, Li$_{0.20}$Ba$_{0.60}$HfO$_{2.7}$, Li$_{0.25}$Ba$_{0.50}$HfO$_{2.625}$, Li$_{0.40}$Ba$_{0.20}$HfO$_{2.7}$, Li$_{0.34}$La$_{0.55}$HfO$_3$, Li$_{0.34}$Ce$_{0.55}$HfO$_3$, Li$_{0.34}$Pr$_{0.55}$HfO$_3$, Li$_{0.34}$Y$_{0.55}$HfO$_3$, Li$_{0.34}$Sc$_{0.55}$HfO$_3$, or a combination thereof.

10. The solid electrolyte of claim 1, wherein the solid electrolyte has an ionic conductivity of about 1×10$^{-6}$ S/cm or more at 25° C.

11. The solid electrolyte of claim 1, wherein an intensity of a first diffraction peak at a diffraction angle of about 31.0° 2θ is greater than an intensity of a second diffraction peak at a diffraction angle of about 21.8° 2θ, when analyzed by X-ray diffraction using Cu Kα radiation.

12. The solid electrolyte of claim 1, wherein a first diffraction peak has an intensity in an area where a diffraction angle is about 31.0° 2θ and a second diffraction peak in an area where a diffraction angle is about 21.8° 2θ, and wherein the intensity of the first diffraction peak is about the same as to about 25 times greater than the intensity of the second diffraction peak, when analyzed by X-ray diffraction using Cu Kα radiation.

13. The solid electrolyte of claim 1, wherein the solid electrolyte has a pellet density of about 4 grams per cubic centimeter to about 7.5 grams per cubic centimeter.

14. A protection layer for a lithium battery, the protection layer comprising:
the solid electrolyte of claim 1, wherein the solid electrolyte is disposed on a cathode or an anode.

15. A metal air battery comprising:
a cathode;
an anode; and
an electrolyte between the cathode and the anode,
wherein at least one of the cathode, the anode, or the electrolyte includes the solid electrolyte of claim 1.

16. The metal air battery of claim 15, wherein the electrolyte comprises the solid electrolyte.

17. The metal air battery of claim 15, wherein the anode comprises lithium.

18. An electrochemical device comprising:
an anode;
a cathode; and
the solid electrolyte of claim 1 between the anode and the cathode.

19. The electrochemical device of claim 18, wherein the electrochemical device is a battery, an accumulator, a supercapacitor, a fuel cell, a sensor, or an electrochromic device.

20. A method of preparing a solid electrolyte, the method comprising:
providing a precursor mixture comprising a lithium precursor, a hafnium precursor, and an M precursor; and
heat-treating the precursor mixture to prepare a solid electrolyte comprising an oxide represented by Formula 1, $$Li_yM_zHfO_{3-x} \quad \text{Formula 1}$$

wherein in Formula 1,
M is Sr, Ba, Ca, Mg, La, Ce, Pr, Gd, Y, Sc, or a combination thereof, and
0≤x<3, 0<y<1, and 0<z<1.

21. The method of claim 20, wherein the heat-treating comprises a primary heat-treating at about 600° C. to about 950° C. in an inert gas or in an oxidizing gas.

22. The method of claim 20, further comprising:
pulverizing the primary heat-treated precursor mixture to obtain a pulverized product; and secondary heat-treating the pulverized product.

23. The method of claim 22, wherein the secondary heat-treating of the pulverized product comprises heat-treating at about 900° C. to about 1300° C.

24. The method of claim 23, wherein the secondary heat-treating comprises heat-treating in a mixed gas comprising about 1 volume percent to about 10 volume percent of a reducing gas and about 90 volume percent to 99 volume percent of an inert gas, based on a total volume of the mixed gas.

* * * * *